(12) United States Patent
Chen (10) Patent No.: US 9,172,241 B2
(45) Date of Patent: Oct. 27, 2015

(54) ELECTROSTATIC DISCHARGE PROTECTION CIRCUIT HAVING HIGH ALLOWABLE POWER-UP SLEW RATE

(75) Inventor: Jau-Wen Chen, Cupertino, CA (US)

(73) Assignee: NVIDIA Corporation, Santa Clara, CA (US)

(*) Notice: Subject to any disclaimer, the term of this patent is extended or adjusted under 35 U.S.C. 154(b) by 750 days.

(21) Appl. No.: 13/436,607

(22) Filed: Mar. 30, 2012

(65) Prior Publication Data

US 2013/0258533 A1    Oct. 3, 2013

(51) Int. Cl.
*H02H 9/00* (2006.01)
*H02H 9/04* (2006.01)

(52) U.S. Cl.
CPC .................................. *H02H 9/046* (2013.01)

(58) Field of Classification Search
USPC ............................................................ 361/56
See application file for complete search history.

(56) References Cited

U.S. PATENT DOCUMENTS

| | | | | |
|---|---|---|---|---|
| 5,825,601 A * | 10/1998 | Statz et al. | | 361/56 |
| 5,946,177 A * | 8/1999 | Miller et al. | | 361/56 |
| 2004/0257728 A1 * | 12/2004 | Hu | | 361/56 |
| 2005/0068702 A1 * | 3/2005 | Connor et al. | | 361/56 |
| 2007/0053120 A1 * | 3/2007 | Gauthier et al. | | 361/56 |
| 2009/0097174 A1 * | 4/2009 | Ker et al. | | 361/56 |
| 2010/0271736 A1 * | 10/2010 | Rien et al. | | 361/18 |
| 2012/0180008 A1 * | 7/2012 | Gist et al. | | 716/101 |
| 2013/0258533 A1 * | 10/2013 | Chen | | 361/56 |
| 2014/0063665 A1 * | 3/2014 | Chen et al. | | 361/56 |

OTHER PUBLICATIONS

Jeremy C. Smith, et al., "A MOSFET Power Supply Clamp with Feedback Enhanced Triggering for ESD Protection in advanced SMOS Technologies," EOS/ESD Symposium, 2003, 9 pages.
Michael Stockinger, et al., "Boosted and Distributed Rail Clamp Networks for ESD Protection in Advanced CMOS Technologies," EOS/ESD Symposium, 2003, 10 pages.

* cited by examiner

*Primary Examiner* — Ronald W Leja
(74) *Attorney, Agent, or Firm* — Artegis Law Group, LLP (57) ABSTRACT

A technique for providing electrostatic discharge (ESD) protection in complementary metal-oxide semiconductor (CMOS) technologies is disclosed. A power supply RC-based ESD protection circuit having an RC value in the nanosecond range increases the allowable power-up slew rate so that fast power-up events (e.g., hot-plug and power switching operations) are not erroneously interpreted as ESD events. Because the RC value is small, the layout area needed for the RC-based ESD protection circuit is also reduced.

21 Claims, 11 Drawing Sheets

PRIOR ART

ELECTROSTATIC DISCHARGE PROTECTION CIRCUIT HAVING HIGH ALLOWABLE POWER-UP SLEW RATE

BACKGROUND OF THE INVENTION

1. Field of the Invention

The present invention generally relates to electrostatic discharge (ESD) protection circuits and more specifically to a power supply RC-based ESD protection clamp circuit.

2. Description of the Related Art

In CMOS (complementary metal-oxide-semiconductor) technologies, a power supply ESD protection clamp provides a low-impedance path from the power supply to the ground supply when an ESD event occurs. An ESD event occurs when a voltage transient having a fast rise and a fast decay time is input to the power or ground supply. However, a power-up event, even a fast power-up event such as may occur when a device is "hot plugged" should not be interpreted as an ESD event.

Figure 1:
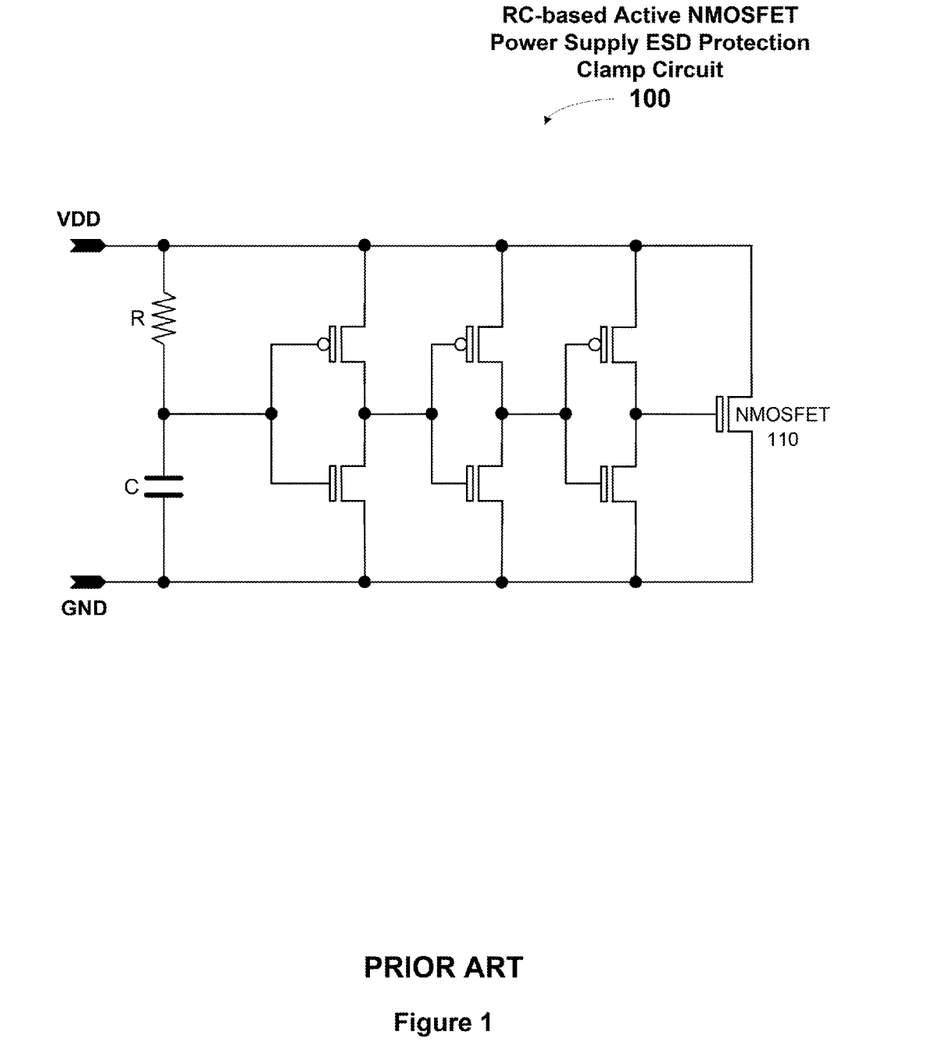
FIG. 1 illustrates a conventional RC-based active NMOS-FET power supply ESD protection clamp circuit, according to the prior art.

Conventional RC-based ESD protection circuits rely on an RC-based active NMOSFET (metal-oxide-semiconductor field-effect transistor with N-type channel) as the power supply ESD protection clamp. In contrast with other ESD protection circuits that depend on avalanche junction breakdown phenomena to operate, the RC-based active NMOSFET power supply ESD protection clamp provides a lower turn-on voltage and clamps lower ESD-induced voltage drops during ESD events. FIG. 1 illustrates a conventional RC-based active NMOSFET power supply ESD protection clamp circuit 100, according to the prior art.

To achieve high ESD protection efficiency, the size of the active NMOSFET 110 must be sufficiently large so that the NMOSFET 110 can provide a very low impedance path for the ESD current. To ensure that NMOSFET 110 is fully turned on during ESD events, the RC time constant determined by the resistor R and the capacitor C needs to be greater than the width of a voltage transient that is an ESD event. A typical RC time constant should be greater than 1 us for all process corner variations. Achieving an RC time constant greater than 1 us typically necessitates a large capacitor layout area which is usually larger than the layout area of the NMOSFET 110 in modern CMOS technologies. The large RC time constant layout area negatively impacts the overall die size. As CMOS technologies advance with very thin gate oxide, the larger capacitor in the RC time constant is all associated with significant stand-by power consumption due to a high gate leakage current. Therefore, reducing the die area consumed by the layout of capacitor C used in the power supply ESD protection clamp circuit is desirable.

Further complicating the design of the power supply ESD protection clamp circuit, fast power-up events that occur for hot-plug and power supply switching applications may have voltage ramp times of 1 us or less. Therefore, a RC time constant in the micro-second range may cause the NMOSFET 110 to be falsely triggered during a fast power-up event having a voltage ramp time of less than 10 us. Typical RC-based ESD protection clamp circuits have an allowable power-up slew rate of at least 5V/us or higher to avoid circuit malfunction or silicon damage. However, the maximum allowable power-up slew rate of the RC-based active NMOSFET power supply ESD protection clamp circuit 100 is close to 0.1V/us due to having a high RC time constant.

Accordingly, what is needed in the art is a power supply RC-based ESD protection clamp circuit that uses a resistor and capacitor having a smaller RC time constant, and reduced layout area that also has a very high allowable power-up voltage slew rate.

SUMMARY OF THE INVENTION

One embodiment of the present invention sets forth a technique for providing ESD protection in CMOS technologies. A RC-based ESD protection circuit having a RC value in the nanosecond range increases the allowable power-up slew rate so that fast power-up events (e.g., hot-plug and power supply switching) are not erroneously interpreted as ESD events. Because the RC value is small, the layout area needed for the RC-based ESD protection circuit is also reduced.

Various embodiments of the invention comprise an RC-based ESD protection circuit. The RC-based ESD protection circuit comprises an RC filter and pull-up sub-circuit that is configured to detect an ESD event and pull-up a switch node, where the RC filter and pull-up sub-circuit includes a resistor and a first capacitor having an RC time constant. The RC-based ESD protection circuit also comprises a controlling sub-circuit that is coupled to the RC filter and pull-up sub-circuit and activated after the switch node is pulled up by the RC filter and pull-up sub-circuit and configured to isolate the switch node from a VDD supply and a GND supply after the switch node is pulled up by the RC filter and pull-up sub-circuit. The RC-based ESD protection circuit also comprises an ESD sub-circuit that is coupled to the switch node and is activated to conduct an ESD current when the switch node is pulled-up by the RC filter and pull-up sub-circuit.

Various embodiments of the invention set forth a method for providing ESD protection for a circuit. The method includes the steps of receiving a transient voltage at an RC-based ESD protection circuit, determining that the transient voltage represents an ESD event and that ESD protection should be activated, pulling up a switch node by an RC filter and pull-up sub-circuit to enable an ESD sub-circuit to conduct an ESD current, deactivating the RC filter and pull-up sub-circuit once the switch node is pulled-up, and isolating the switch node from a VDD supply and a GND supply by a controlling sub-circuit that is activated as the switch node is pulled up, wherein the ESD sub-circuit continues to conduct the ESD current when the switch node is isolated.

Various embodiments of the invention comprise an integrated circuit, comprising a VDD power supply that is coupled to an input pin of the integrated circuit and an RC-based electrostatic discharge (ESD) protection circuit that is coupled to the VDD power supply. The ESD protection circuit comprises an RC filter and pull-up sub-circuit that is configured to detect an ESD event and pull-up a switch node. A controlling sub-circuit that is coupled to the RC filter and pull-up sub-circuit is activated after the switch node is pulled up by the RC filter and pull-up sub-circuit and the controlling sub-circuit is configured to isolate the switch node from the VDD supply and a GND supply after the switch node is pulled up by the RC filter and pull-up sub-circuit. The ESD protection circuit also comprises an ESD sub-circuit that is coupled to the switch node and is activated to conduct an ESD current when the switch node is pulled-up by the RC filter and pull-up sub-circuit. The ESD protection circuit also comprises a controlled pull-down sub-circuit that is coupled to the switch node and controlled by the controlling sub-circuit to pull the switch node down and disable the ESD sub-circuit when the ESD event terminates.

One advantage of the disclosed power supply RC-based ESD protection clamp circuit that is that the circuit uses a resistor and capacitor having a smaller RC time constant.

Therefore, the layout area of the capacitor is reduced. The power supply RC-based ESD protection clamp circuit also has a very high allowable power-up voltage slew rate so that hot-plug and power supply switching applications are not recognized as ESD events.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 2:
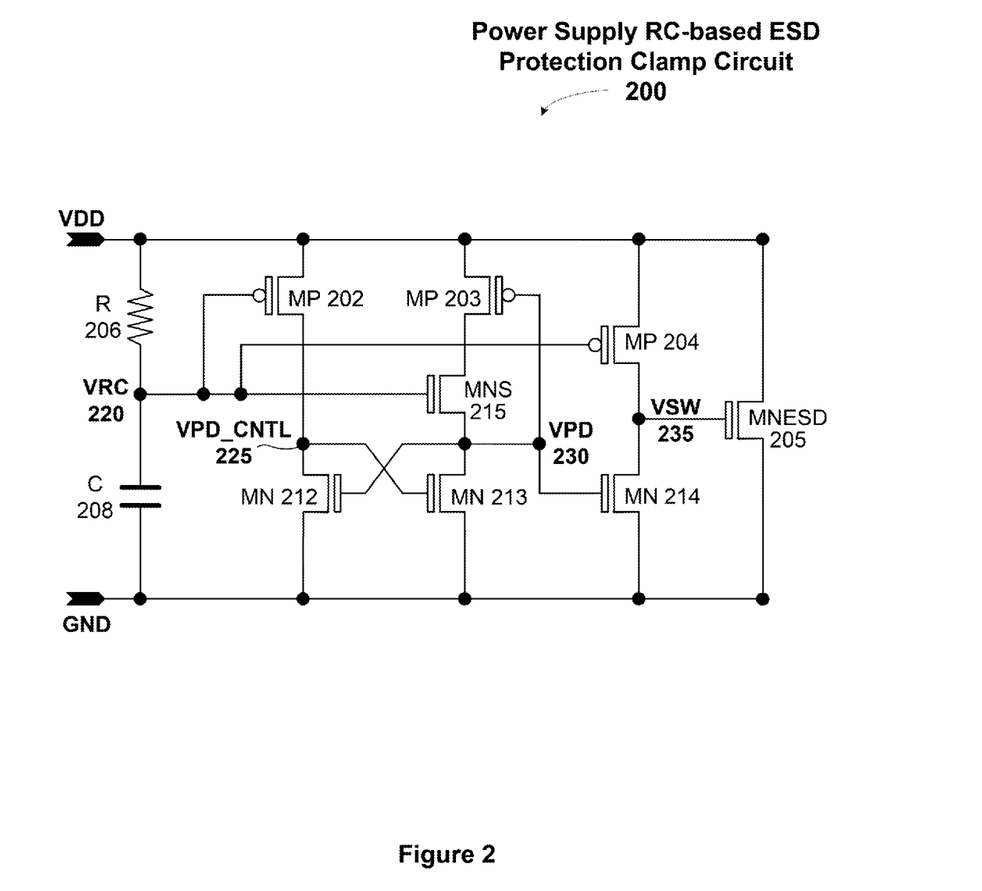
FIG. 2 illustrates a power supply RC-based ESD protection clamp circuit, according to one embodiment of the invention.

FIG. 2 illustrates a power supply RC-based ESD protection clamp circuit 200, according to one embodiment of the invention. As shown in FIG. 2 transistors MN 212, MN 213, MNS 215, MN 214, and MNESD 205 are NMOS devices and transistors MP 202, MP 203, and MP 204 are PMOS devices. The power supply RC-based ESD protection clamp circuit 200 includes four sub-circuits, an RC filter and pull-up sub-circuit, a controlling sub-circuit, a controlled pull-down sub-circuit, and the ESD sub-circuit. A resistor R 206 and a capacitor C 208 and MP 204 are configured to form the RC filter and pull-up sub-circuit having an RC time constant equal to the product of the values of R and C. Transistors MP 202, MP 203, MN 212, MN 213, and MN S 215 are configured to form the controlling sub-circuit. Transistor MN 214 is configured to form the controlled pull-down sub-circuit. Transistor MNESD 205 is configured to form the ESD sub-circuit.

The power supply RC-based ESD protection clamp circuit 200 has a very high allowable power-up slew rate. Unlike the conventional RC-based ESD protection clamp circuit 100 shown in FIG. 1, the controlled pull-down sub-circuit (i.e., MN 214) is controlled by the controlling sub-circuit. The controlling sub-circuit includes a controlled pull-up device, MP 202, a source follower device MNS 215, an active PMOS resistor MP 203, and two "butterfly-type" NMOS devices MN 212 and MN 213. The MP 202 functions as an ESD detector that turns off the MN 214 so that MNESD 205 can be activated by the MP 204 to conduct the ESD current.

When an ESD event is detected, RC filter and pull-up sub-circuit pulls up the switch node, VSW node 235, to activate the ESD sub-circuit by pulling up the gate of MNESD 205 that is coupled to the VSW node 235. After activating the ESD sub-circuit to clamp the ESD current, the pull-up PMOS device MP 204 is turned off due to the small RC time constant. The controlling sub-circuit is configured to allow the VSW node 235 to float after MP 204 is turned off so that the VSW node 235 is independent of VDD and GND. Therefore, the VSW node 235 continues to enable the ESD sub-circuit during the ESD event, until the controlled pull-down sub-circuit pulls the VSW node 235 low, disabling the ESD sub-circuit.

When a positive ESD event (a transient voltage having a voltage ramp time that is less than 30 ns) occurs, MP 202 and MP 204 will be turned on due to the low-pass characteristic of the RC filter and pull-up sub-circuit. The VSW node 235 and VPD_CNTL node 225 are then coupled to the VDD supply and the ESD sub-circuit is activated, i.e., MNESD 205 starts to conduct the ESD current. The voltage of the VRC node 220 rises so that the controlling sub-circuit is activated. Specifically, MP 203, MNS 215, and MN 213 are turned-on and function as a voltage divider where a few milliamps (mA) of transient current flows through MP 203, MNS 215, and MN 213 from the VDD supply to the GND supply. MP 203, MNS 215, and MN 213 are sized so that the voltage of the VPD node 230 is lower than the threshold voltages of the pull-down sub-circuit (MN 214) and MN 212, but is also at the sub-threshold region of MN 212. The voltage divider behavior of the controlling sub-circuit ensures that VSW node 235 floats until the VSW node 235 is pulled down by the pull-down sub-circuit when the ESD event ends.

The RC time constant for the RC filter and pull-up sub-circuit value is in the nanosecond range, the voltage of VRC node 235 is quickly charged to (VDD-Vth_p), where Vth_p is the threshold voltage of MP 204 and MP 202. As VRC node 235 increases to a voltage level that is greater than or equal to (VDD-Vth_p), MP 204 and MP 202 are disabled, i.e., turned off. Even though MP202 is disabled and no longer pulls up the VSW node 235, the VPD_CNTL node 225 remains at voltage that activates MN 213. Therefore, the VPD node 230 remains below the threshold voltages of MN 212 and MN 214 (causing MN 212 and MN 214 to remain off), isolating the VSW node 235 from the VDD supply and the GND supply while VSW node 235 remains at a voltage high enough to activate the MNESD 205. Importantly, MNESD 205 remains activated and keeps conducting the ESD current after MP 204 is deactivated (turned off).

The VPD node 230 is biased at the sub-threshold region of MN 212 by the voltage divider function of the controlling sub-circuit. Therefore, the voltage of VPD_CNTL node 225 drops to pull-up the VSW node 235 before the voltage of the VPD node 230 increases. This "butterfly-type" action performed by the controlling sub-circuit delays a response to the ESD event by the VPD node 230 compared with the VSW node 235. Without the delay, the VPD_CNTL node 225 would turn MN 213 off and pull the voltage of the VPD node 230 up higher than the threshold voltage of the MN 214. When the voltage of the VPD node 230 is pulled up higher than the threshold voltage of the MN 214, MN 214 is activated and the VSW node 235 is coupled to the GND voltage, disabling the ESD sub-circuit (turning MNESD 205 off). During normal power-up operations (non-ESD events) the VSW node 235 disables the ESD sub-circuit.

The MP 203 functions as an active resistor that is controlled by the VPD node 230, so MP 203 dynamically adjusts the impedance of the voltage divider formed by MP 203, MNS 215, and MN 213 to delay the response of the VPD node 230 when an ESD event occurs. Because of the "butterfly-type" action and the active resistor operation of MP 203, MNESD 205 can remain on and conducting the ESD current for a long period of time, usually a few micro-seconds, even when the RC time constant value of the RC filter and pull-up sub-circuit is less than 100 ns.

The purpose of the small RC time constant is to couple the VSW node 235 to the VDD power supply so that the MNESD 205 conducts the ESD current when an ESD event occurs. The controlling sub-circuit is to ensure that MNESD 205 continues to conduct the ESD current until the ESD event terminates.

During normal power-up operations, an ESD event should not be recognized and the ESD sub-circuit should not be enabled. The VDD power supply will ramp at a pre-defined rate which is usually slower than 100V/us. The pre-defined rate is several orders of magnitude slower than the rise times of an ESD event. The power supply RC-based ESD protection clamp circuit 200 is designed to have an RC time constant value in the range of nanoseconds. The RC time constant value ensures that the VRC node 220 remains at a potential near the VDD supply voltage level in response to a slow voltage ramping rate (such a normal power-up) at the VDD supply. As long as the VRC node 220 is at a voltage level higher than (VDD-Vth_p), the MNESD 205 is fully off and remains in a non-conductive state. In other words, the normal power-up operation is not erroneously recognized as an ESD event.

Special applications such as a "hot-plug" event or power-up switching operation may product a very fast transient voltage on the VDD power supply. The power supply RC-based ESD protection clamp circuit 200 should not erroneously recognize a "hot-plug" event or power-up switching operation as an ESD event. To achieve this, the RC time constant value should be below 50 nanoseconds so that the maximum allowable power-up slew rate can be as fast as 5V/us. In other words, an event having a slew rate that is less than or equal to the maximum allowable power-up slew rate is not detected as an ESD event.

Unlike conventional ESD protection circuits that require a large RC time constant, the power supply RC-based ESD protection clamp circuit 200 relies on a small RC time constant value to initiate the ESD protection operation, e.g., enable the ESD sub-circuit. The controlling sub-circuit takes over from the RC filter and pull-up sub-circuit to continue the conduction of the ESD current during the ESD event by continuing to enable the ESD sub-circuit.

Figure 3A:
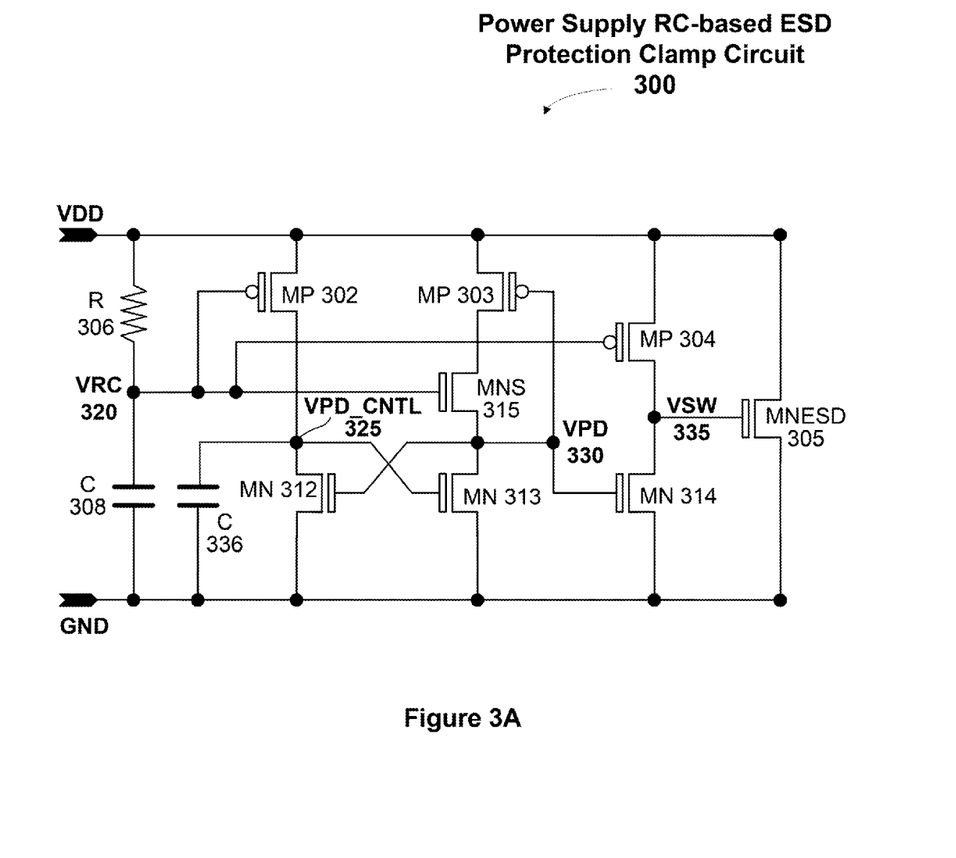
FIG. 3A illustrates another power supply RC-based ESD protection clamp circuit, according to one embodiment of the invention.

FIG. 3A illustrates another power supply RC-based ESD protection clamp circuit 300, according to one embodiment of the invention. The maximum allowable power-up slew rate may be increased by adding another capacitor, C 336, to the power supply RC-based ESD protection clamp circuit 200 to produce the power supply RC-based ESD protection clamp circuit 300. Increasing the maximum allowable power-up slew rate improves the ability of the power supply RC-based ESD protection clamp circuit 300 to recognize only valid ESD events.

Inclusion of the capacitor C 336 at VPD_CNTL 325 decreases the impedance of VPD_CNTL 325 while MN 312 begins conducting. Therefore, it is more difficult to couple VPD_CNTL 325 to the VDD supply, even when MP 302 is turned on during a power up event with a high slew rate. The value of C 336 should be determined so that the low impedance does not have an impact during ESD events (events having <30 ns of ramp time). Meaning, C 336 needs to be big enough to decrease the impedance during high slew rates and low enough to keep MN 314 off for ESD events. Note that the low impedance design cannot be achieved by increasing the size of MN 312 because increasing the size of MN 312 causes VPD_CNTL 325 to be turned off very quickly in response to an ESD event. For example, the voltage at VPD_CNTL 325 is $\sim VDD \times gmp/(gmp+gmn+\omega C)$, where gmp=transconductance of MP 302;
gmn=transconductance of MN 312;
C=capacitance of C 336; and
$\omega$=angular frequency.

As shown in FIG. 3A transistors MN 312, MN 313, MNS 315, MN 314, and MNESD 305 are NMOS devices and transistors MP 302, MP 303, and MP 304 are PMOS devices. The power supply RC-based ESD protection clamp circuit 300 includes the four sub-circuits, an RC filter and pull-up sub-circuit, a controlling sub-circuit, a controlled pull-down sub-circuit, and the ESD sub-circuit. The resistor R 306, a first capacitor C 308, and MP 304 are configured to form the RC filter and pull-up sub-circuit having an RC time constant equal to R*C. Transistors MP 302, MP 303, MN 312, MN 313, and MN S 315 and a second capacitor C 336 are configured to form the controlling sub-circuit. Transistor MN 314 is configured to form the controlled pull-down sub-circuit. Transistor MNESD 305 is configured to form the ESD sub-circuit.

Figure 3B:
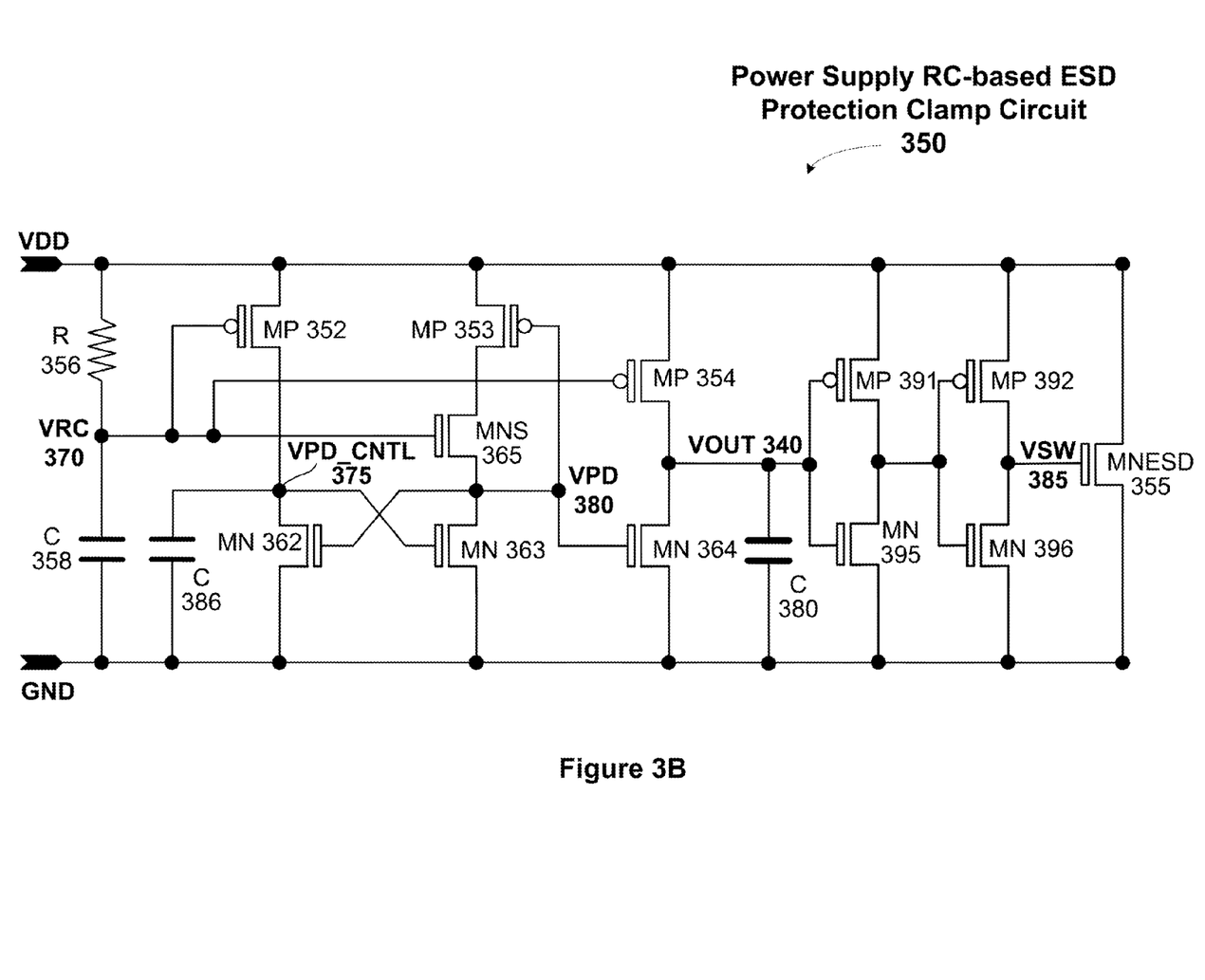
FIG. 3B illustrates yet another power supply RC-based ESD protection clamp circuit, according to one embodiment of the invention.

FIG. 3B illustrates yet another power supply RC-based ESD protection clamp circuit 350, according to one embodiment of the invention. The maximum allowable power-up slew rate may be further increased by adding a third capacitor, C 380, and two inverters to the power supply RC-based ESD protection clamp circuit 300 to produce the power supply RC-based ESD protection clamp circuit 350. As shown in FIG. 3B, the third capacitor 380 is coupled between the Vout node 375 and the GND supply voltage. Inclusion of the third capacitor C 380 in the power supply RC-based ESD protection clamp circuit 350 decreases the impedance of VOUT 340. As a result of the two-stage low-impedance control provided by capacitors C 386 and C 380, MNESD 355 is able to withstand higher power-up slew rates without falsely triggering ESD protection. Transistors 391 and 395 and transistors 392 and 396 are configured as two inverters that perform a buffer function.

The capacitors C 386 and C 380 provide an extra impedance to resist charging of the VPD_CNTL node 375 and the VOUT node 340, respectively, to the VDD power supply. C 386 and C 380 can have high values, so the values of C 386 and C 380 should be chosen to ensure that actual ESD events having rise times less than 30 ns are detected. Inclusion of C 386 and C 380 in the power supply RC-based ESD protection clamp circuit 350 may increase the maximum allowable power-up slew rate to a rate higher than 10V/us (compared with 5V/us for the power supply RC-based ESD protection clamp circuit 200).

As shown in FIG. 3B transistors MN 362, MN 363, MNS 365, MN 364, MP 391, MP 392, and MNESD 305 are NMOS devices and transistors MP 352, MP 353, MP 354, MN 395, and MN 396, are PMOS devices. The power supply RC-based ESD protection clamp circuit 300 includes the four sub-circuits, an RC filter and pull-up sub-circuit, a controlling sub-circuit, a controlled pull-down sub-circuit, and the ESD sub-circuit. The resistor R 356, a first capacitor C 358, and MP 354 are configured to form the RC filter and pull-up sub-circuit having an RC time constant equal to R*C. Transistors MP 352, MP 353, MN 362, MN 363, and MN S 365 and a second capacitor C 386 are configured to form the controlling sub-circuit. Transistor MN 364 and C 380 are configured to form the controlled pull-down sub-circuit. Transistor MNESD 355 is configured to form the ESD sub-circuit.

Compared with some conventional ESD protection circuits, the power supply RC-based ESD protection clamp circuits 200, 300, and 350 do not require a separate dedicated power supply voltage that is used only for ESD protection. Also, only a single RC filter sub-circuit is needed by the power supply RC-based ESD protection clamp circuits 200, 300, and 350 to detect and activate the ESD protection. Finally, the power supply RC-based ESD protection clamp circuits 200, 300, and 350 do not rely on feedback from the VSW node to either the VPD node or the VPD_CNTL node.

Figure 4A:
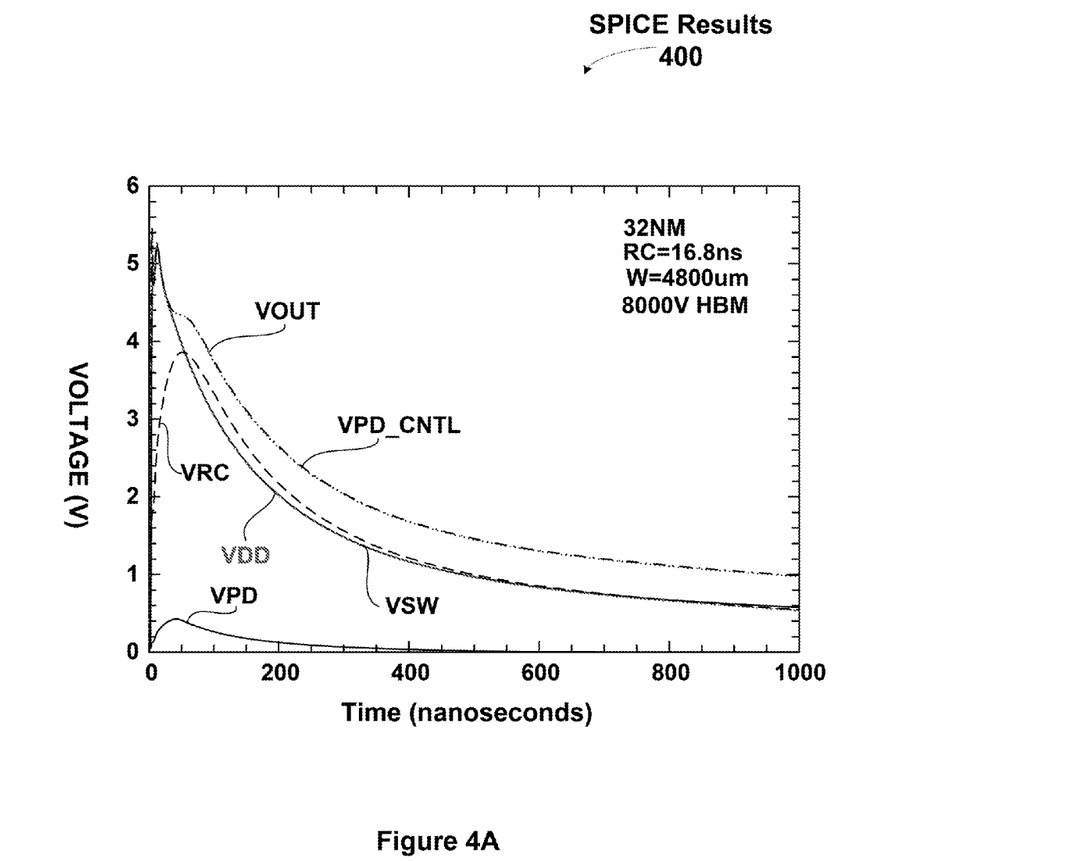
FIG. 4A is an illustration of SPICE (simulation program with integrated circuit emphasis) results for the power supply RC-based ESD protection clamp circuit shown in FIG. 3B, according to one embodiment of the invention.

FIG. 4A is an illustration of SPICE (simulation program with integrated circuit emphasis) results 400 for the power supply RC-based ESD protection clamp circuit 350 shown in FIG. 3B, according to one embodiment of the invention. The SPICE simulations results of the internal node voltages over time during a 8000V HBM (Human-Body Model) discharge in 32 nm technology. For the simulation shown in FIG. 4A, the power supply RC-based ESD protection clamp circuit 350 has an RC≈16.8 ns, C 386 and C 380 of 0.5 pF, and the total width of MNESD 355 is 4800 um. As can be seen in the results shown in FIG. 4A, the power supply RC-based ESD protection clamp circuit 350 provides ESD protection for HBM events up to 1 us even when RC=16.8 ns.

Upon initiation of the HBM event, the VRC node 370 responds to the voltage rise of the VDD supply but remains lower than the VDD supply level due to the low-pass RC time constant value. Transistors MP 352 and MP 354 are turned on immediately, and MNESD 355 begins conducting to sink the ESD current. Consequently, the VPD_CNTL node 375, the VOUT node 340, and the VSW node 385 are coupled to the VDD supply level and track the level of VDDA in FIG. 4A. When the time reaches ~35 ns (which is around twice the value of the RC time constant), MP 352 and MP 354 begin to turn off so that the VOUT node 340 and the VPD_CNTL node 375 are isolated from the VDD supply. Because the the ESD sub-circuit continues to conduct the ESD current through the MNESD 355, a small transient current flows from the VPD_CNTL node 375 and the VOUT node 340 to the VDD supply through the parasitic P/N diode within MP 352 and MP 354. The small transient currents cause the voltages of the VPD_CNTL node 375 and the VOUT node 340 to be at a higher level compared with the VDD supply. The small transient currents also cause the VRC node 370 to be at a slightly higher voltage compared with the VDD supply.

As the VPD_CNTL node 375 is coupled to the VDD supply, the MN 363 is turned on and the dynamic voltage divider function of the controlling sub-circuit is activated for the ESD event. The MP 353 acts as an active resistor of the dynamic voltage divider to balance the impedance so that the voltage of the VPD node 380 is always lower than the threshold voltage of MN 364 and MN 362. After the MP 352 is turned off when the voltage of the VRC node 370 becomes less than (VDD-Vth_p), the "butterfly-type" transistors (MN 362 and MN 363) provide a long delay to keep MN 364 off during the ESD event. Therefore, the VOUT node 340 is floating and isolated from the VDD supply and the GND supply.

Figure 4B:
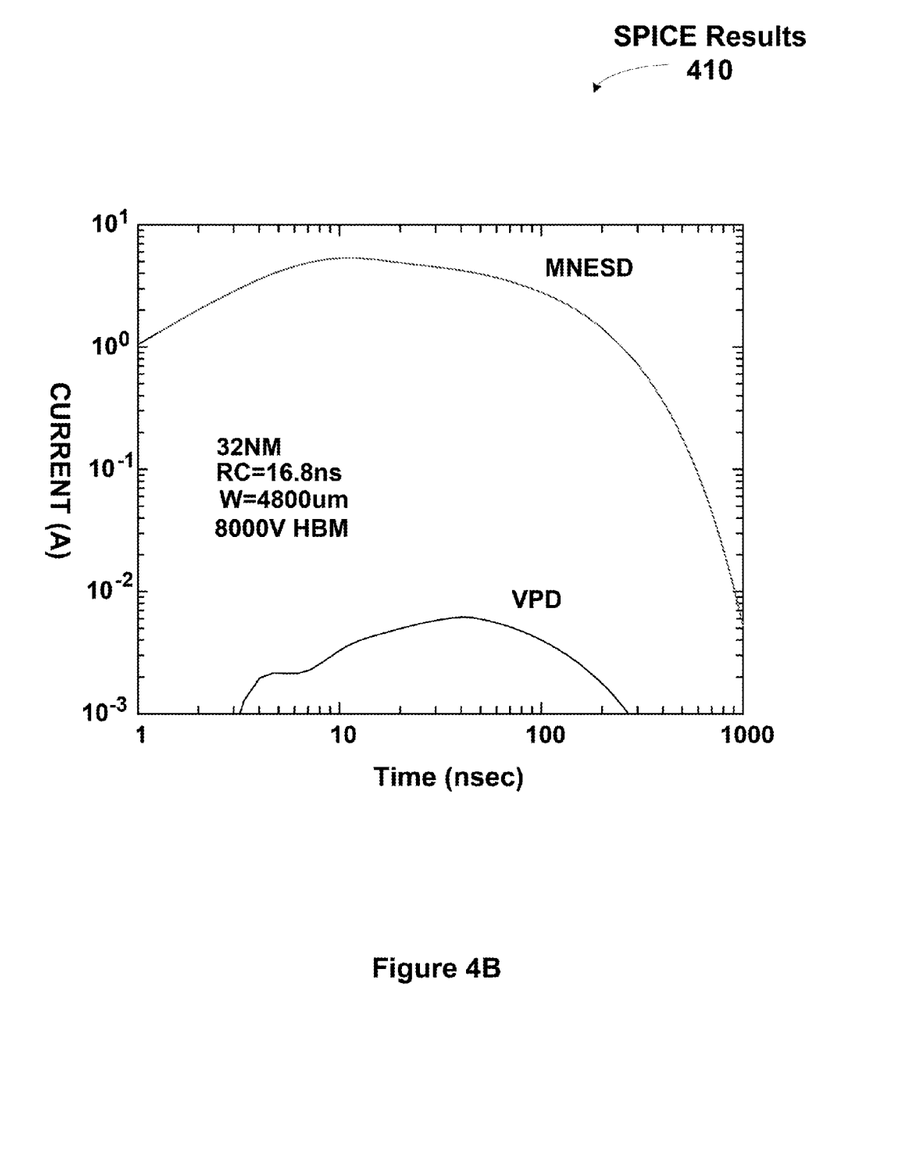
FIG. 4B is an illustration of SPICE results for current flow in the power supply RC-based ESD protection clamp circuit shown in FIG. 3B, according to one embodiment of the invention.

FIG. 4B is an illustration of SPICE results 410 for current flow in the power supply RC-based ESD protection clamp circuit 350 shown in FIG. 3B, according to one embodiment of the invention. The SPICE results 410 shown in FIG. 4B illustrate the ESD current that is sunk by the MNESD 355 and the transient current at the VPD node 380 during the simulation shown in FIG. 4A. The transient current, having peak current of ~6 mA, flows into the voltage divider formed by MP 353, MNS 365 and MN 363.

Figure 4C:
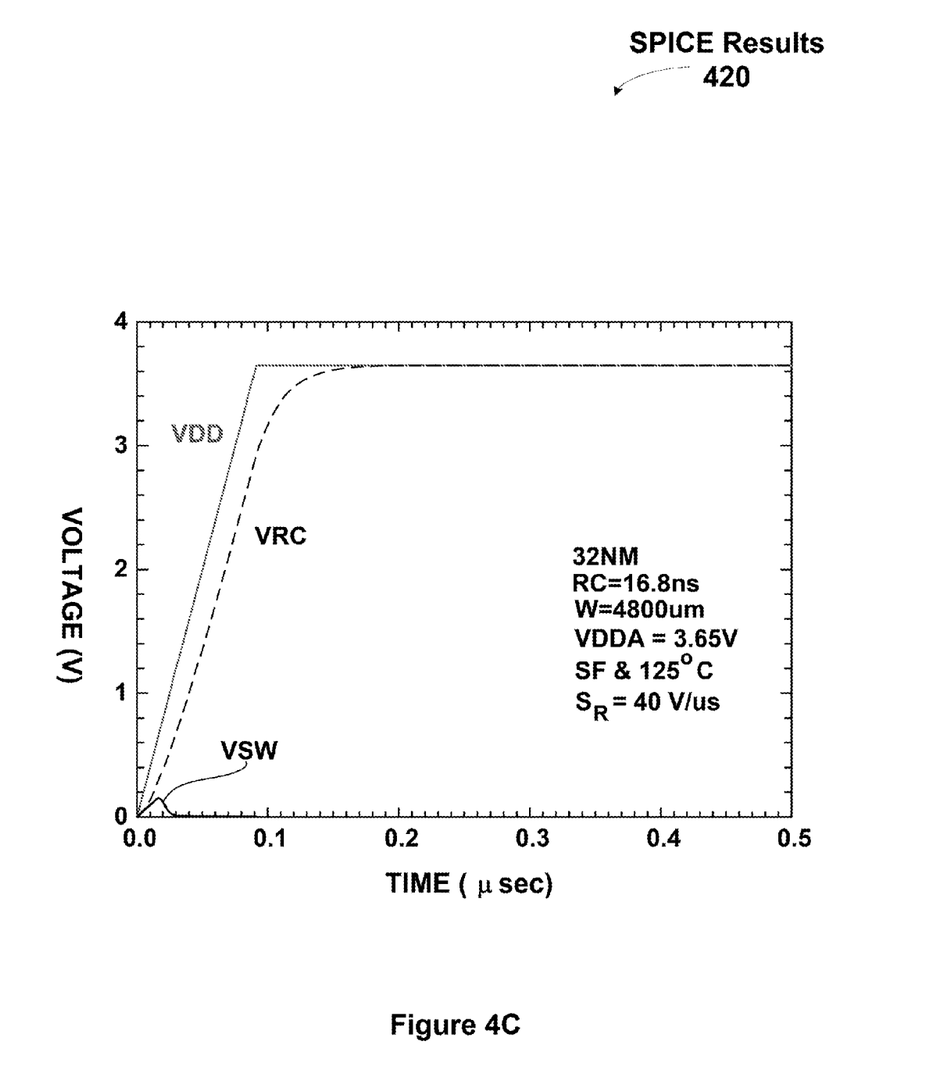
FIG. 4C is an illustration of results for the power supply RC-based ESD protection clamp circuit shown in FIG. 3B during power-up, according to one embodiment of the invention.

FIG. 4C is an illustration of SPICE results 420 for the power supply RC-based ESD protection clamp circuit 350 shown in FIG. 3B during power-up, according to one embodiment of the invention. The power-up simulation shown in FIG. 4C uses a slew rate of 40V/us for VDD=3.65V at 125 degrees C. (i.e. ~90 ns of ramp time). The values of C 386 and C 380 in the power supply RC-based ESD protection clamp circuit 350 are set to 0.5 pF. As can be seen in FIG. 4C, the VSW node 385 remains at ~0.15V which is lower than the threshold voltage of the MNESD 355 (~0.42V in 32 nm technology). Therefore, the MNESD 355 remains non-conductive, i.e., an ESD event is not detected, even when the power-up slew rate is as high as 40V/us. The power supply RC-based ESD protection clamp circuit 350 can achieve an allowable power-up slew rate that is higher than 40V/us. A high allowable power-up slew rate allows the power supply RC-based ESD protection clamp circuit 350 to avoid erroneously detecting an ESD event for power-up applications, including "hot-plug" and power switching operation applications.

Figure 4D:
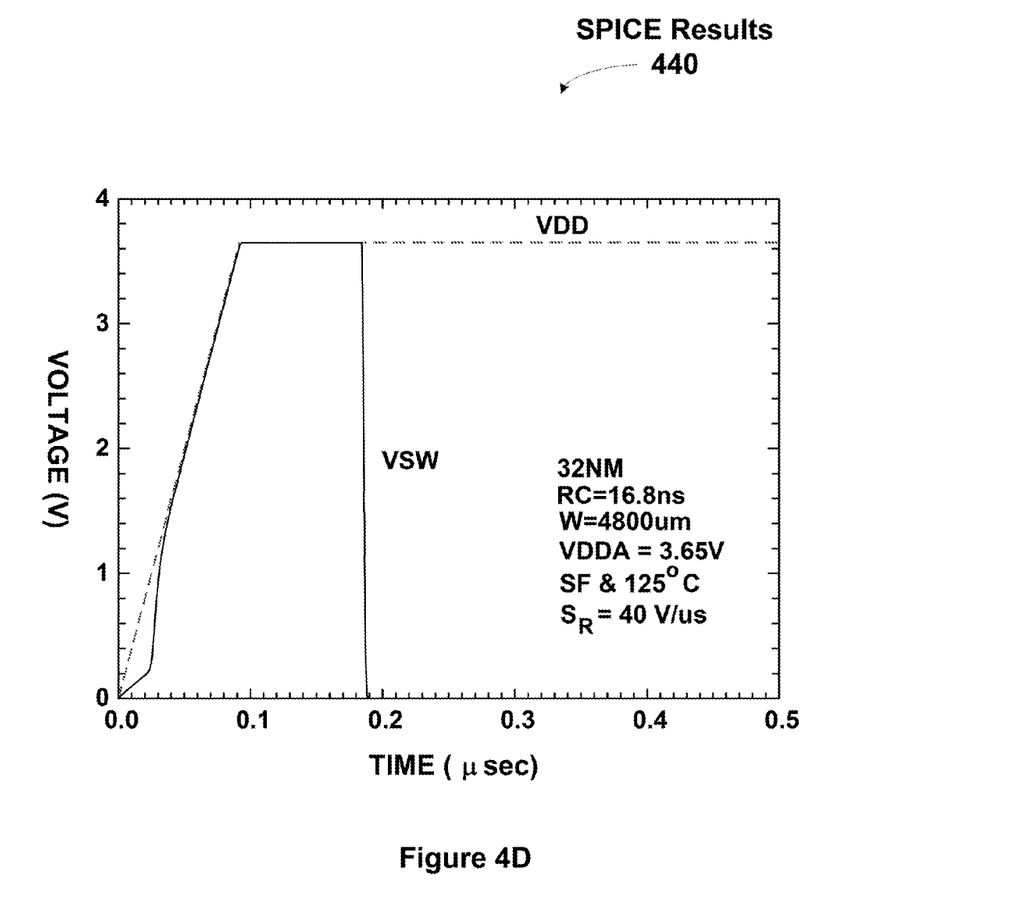
FIG. 4D is an illustration of SPICE results for the power supply RC-based ESD protection clamp circuit shown in FIG. 3B during power-up with reduced capacitance values, according to one embodiment of the invention.

FIG. 4D is an illustration of SPICE results 440 for the power supply RC-based ESD protection clamp circuit 350 shown in FIG. 3B during power-up with reduced capacitance values, according to one embodiment of the invention. The power-up simulation shown in FIG. 4C also uses a slew rate of 40V/us for VDD=3.65V at 125 degrees C. (i.e. ~90 ns of ramp time), but the values of C 386 and C 380 in the power supply RC-based ESD protection clamp circuit 350 are set to zero. As can be seen in FIG. 4D, the VSW node 385 is coupled to the VDD supply and the MNESD 355 is enabled. When the same slew rate of 40V/us was simulated to produce the results shown in FIG. 4C the MNESD 355 was not enabled. Therefore, the capacitors C 386 and C380 can be used to increase the allowable power-up slew rate beyond 40V/us in 32 nm technology.

Figure 5A:
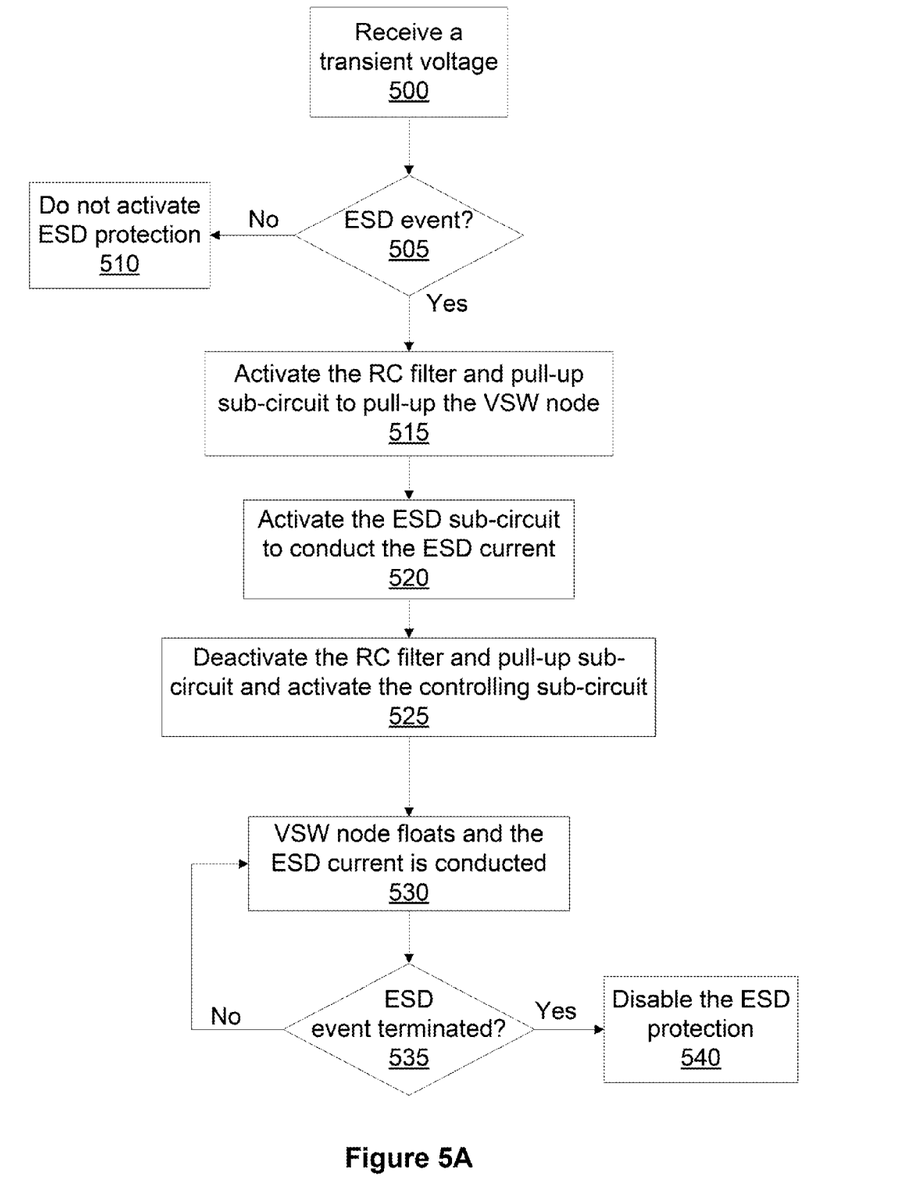
FIG. 5A is a flow diagram of method steps for performing ESD protection using the power supply RC-based ESD protection clamp circuit shown in FIGS. 2, 3A, and/or 3B, according to one embodiment of the invention.

FIG. 5A is a flow diagram of method steps for performing ESD protection using the power supply RC-based ESD protection clamp circuits 200, 300, and 350 shown in FIGS. 2, 3A, and/or 3B, respectively, according to one embodiment of the invention. Although the method steps are described in conjunction with the power supply RC-based ESD protection clamp circuits 200, 300, and 350, persons of ordinary skill in the art will understand that any system configured to perform the method steps, in any order, is within the scope of the disclosure.

At step 500 a transient voltage is received by the power supply RC-based ESD protection clamp circuit. At step 505 the power supply RC-based ESD protection clamp circuit determines if an ESD event has occurred and that the ESD protection should be activated. Whether or not the ESD protection is activated is based on the slew rate of the transient voltage and the RC time constant of the power supply RC-based ESD protection clamp circuit. In one embodiment, the RC time constant value is less than 20 nanoseconds. If the power supply RC-based ESD protection clamp circuit determines that the ESD protection should not be activated, then at step 510 the ESD protection is not activated, i.e., the pull-down sub-circuit remains off and MNESD is not enabled. Specifically, the gate of the MSESD is coupled to the GND supply by the pull-down sub-circuit and the MSESD is not enabled to conduct an ESD current.

Otherwise, at step 515, the RC filter and pull-up circuit pulls up the VSW node, enabling MSESD to conduct the ESD current. At step 520 the ESD sub-circuit is enabled and the MSESD conducts the ESD current. At step 525, as VSW is pulled up, the RC filter and pull-up circuit is deactivated and the controlling sub-circuit is activated. The dynamic voltage divider function of the controlling sub-circuit operates to isolate the VSW node from the VDD supply and the GND supply. An active resistor in the voltage divider dynamically adjusts the voltage level of the VPD node. At step 530 the VSW node floats and the MSESD continues to conduct the ESD current.

At step 535 the power supply RC-based ESD protection clamp circuit determines if the ESD event has terminated, and, if not, the power supply RC-based ESD protection clamp circuit repeats step 530. Otherwise, at step 540 the pull-down sub-circuit is activated and the ESD sub-circuit is disabled. The gate of the MSESD is coupled to the GND supply by the pull-down sub-circuit and the MSESD stops conducting the ESD current. The "butterfly type" circuitry within the controlling sub-circuit delays the operation of the dynamic voltage divider so that the power supply RC-based ESD protection clamp circuit is not falsely triggered to perform ESD protection during a power-up application including "hot-plug" and power supply switching operations.

Compared with conventional ESD protection circuits, the layout area consumed for the resistor and the capacitor included in the RC filter and pull-up sub-circuit of the power supply RC-based ESD protection clamp circuit can be significantly reduced. A reduction in the layout area is beneficial for both chip floor planning and overall chip die size. The small layout area of the power supply RC-based ESD protection clamp circuit allows for a more uniform distribution of the power supply RC-based ESD protection clamp circuit throughout an entire chip. Additionally, the small layout of the power supply RC-based ESD protection clamp circuit enables the circuit to be used as an I/O ESD protection circuit when the I/O pins of the chip are required to not associate with the power supply, i.e., tolerant and open-drain I/O designs.

Figure 5B:
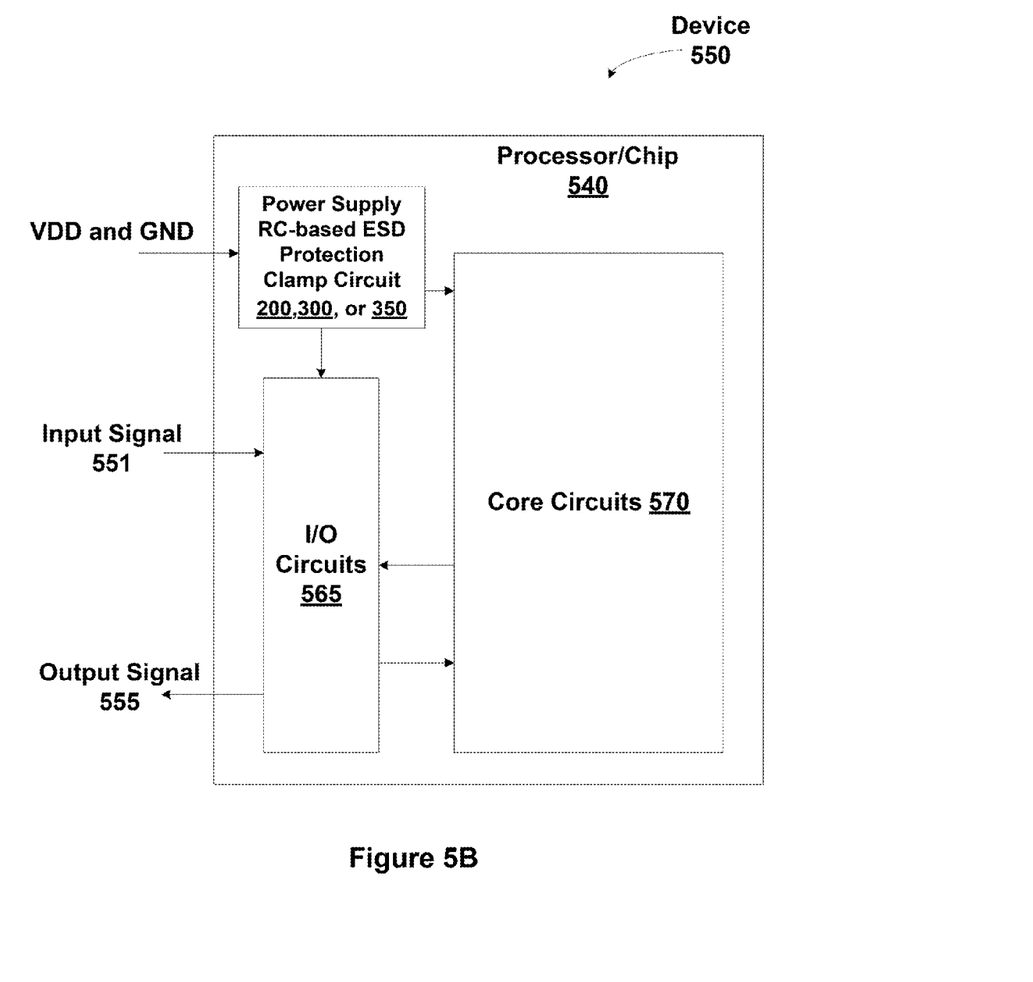
FIG. 5B is a block diagram illustrating a processor/chip including a power supply RC-based ESD protection clamp circuit shown in FIGS. 2, 3A, and/or 3B, according to one embodiment of the invention.

FIG. 5B is a block diagram illustrating a processor/chip 540 including the power supply RC-based ESD protection clamp circuit 200 from FIG. 2, the power supply RC-based ESD protection clamp circuit 300 from FIG. 3A, or the power supply RC-based ESD protection clamp circuit 350 from FIG. 3B, in accordance with one or more aspects of the present invention. The power supply RC-based ESD protection clamp circuit 200, 300, or 350 is coupled to the power supply rails (VDD and GND) and configured to perform ESD protection functions. At a minimum, each power supply level is separately coupled a power supply RC-based ESD protection clamp circuit 200/300/350. The power supply rails are also routed to the I/O circuits 565 and the core circuits 570. I/O circuits 565 may include pads and other I/O specific circuits to send and receive signals from other devices in a system. Output signal 555 is produced by I/O circuits 565 based on signals received by the I/O circuits 565. The input signal 551 is received by the I/O circuits 565 and is input to the core circuits 570. The core circuits 570 generate an output that is provided to the I/O circuits 565.

System Overview

Figure 6:
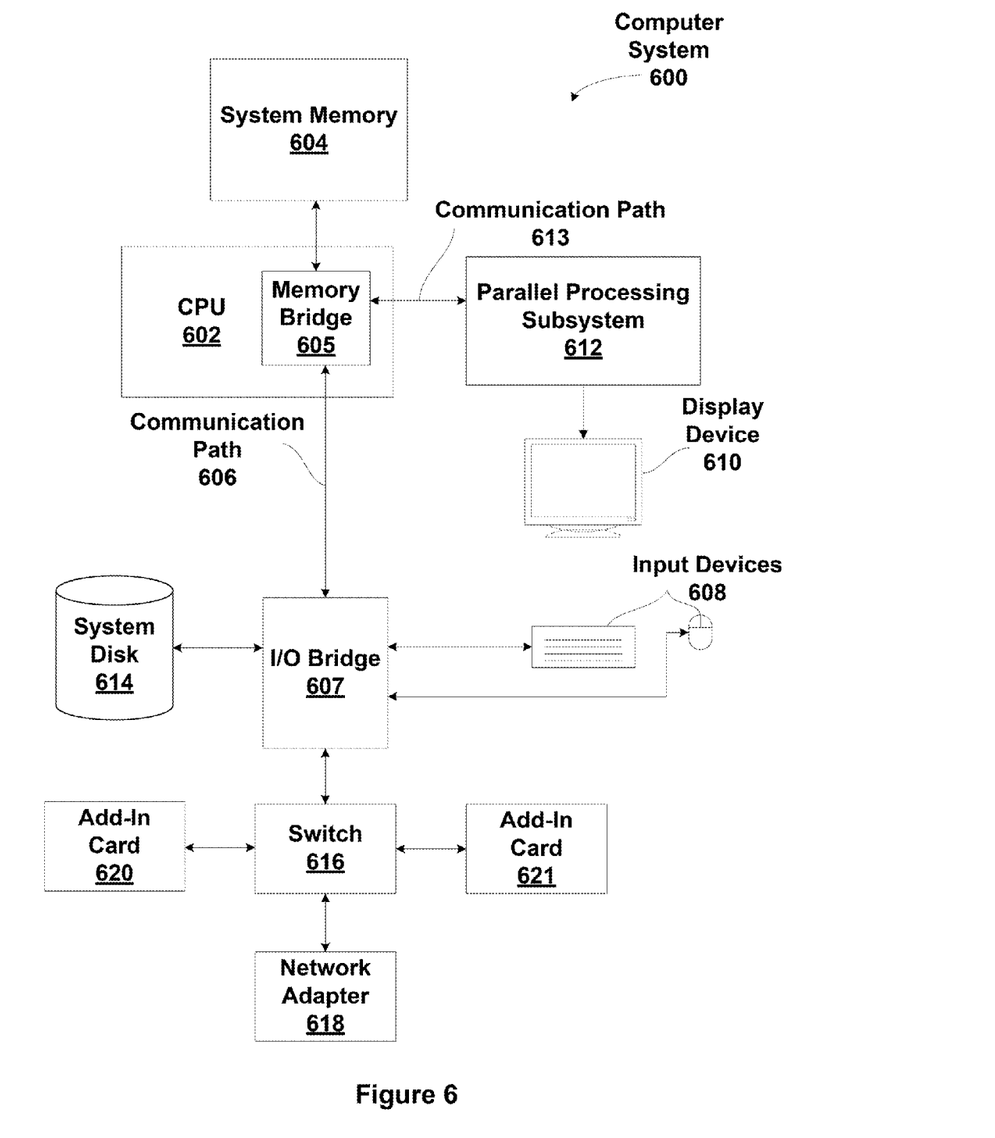
FIG. 6 is a block diagram illustrating a computer system configured to implement one or more aspects of the present invention.

FIG. 6 is a block diagram illustrating a computer system 100 configured to implement one or more aspects of the present invention. Computer system 600 includes a central processing unit (CPU) 602 and a system memory 604 communicating via a bus path through a memory bridge 605. Memory bridge 605 may be integrated into CPU 602 as shown in FIG. 6. Alternatively, memory bridge 605, may be a conventional device, e.g., a Northbridge chip, that is connected via a bus to CPU 602. Memory bridge 605 is connected via communication path 606 (e.g., a HyperTransport link) to an I/O (input/output) bridge 607. I/O bridge 607, which may be, e.g., a Southbridge chip, receives user input from one or more user input devices 608 (e.g., keyboard, mouse) and forwards the input to CPU 602 via path 606 and memory bridge 605. A parallel processing subsystem 612 is coupled to memory bridge 605 via a bus or other communication path 613 (e.g., a PCI Express, Accelerated Graphics Port, or HyperTransport link); in one embodiment parallel processing subsystem 612 is a graphics subsystem that delivers pixels to a display device 610 (e.g., a conventional cathode ray tube, liquid crystal display, light-emitting diode display, or the like). A system disk 614 is also connected to I/O bridge 607. A switch 616 provides connections between I/O bridge 607 and other components such as a network adapter 618 and various add-in cards 620 and 621. Other components (not explicitly shown), including USB or other port connections, CD (compact disc) drives, DVD (digital versatile disc) drives, film recording devices, and the like, may also be connected to I/O bridge 607. Communication paths interconnecting the various components in FIG. 6 may be implemented using any suitable protocols, such as PCI (Peripheral Component Interconnect), PCI-Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 612 incorporates circuitry optimized for graphics and video processing, including, for example, video output circuitry, and constitutes a graphics processing unit (GPU). In another embodiment, the parallel processing subsystem 612 incorporates circuitry optimized for general purpose processing, while preserving the underlying computational architecture, described in greater detail herein. In yet another embodiment, the parallel processing subsystem 612 may be integrated with one or more other system elements, such as the memory bridge 605, CPU 602, and I/O bridge 607 to from a system on chip (SoC). One or more of CPU 602, parallel processing sub-system 612, I/O bridge 607, and switch 616 may include the power supply RC-based ESD protection clamp circuit 200, 300, and/or 350.

It will be appreciated that the system shown herein is illustrative and that variations and modifications are possible. The connection topology, including the number and arrangement of bridges, may be modified as desired. For instance, in some embodiments, system memory 604 is connected to CPU 602 directly rather than through a bridge, and other devices communicate with system memory 604 via memory bridge 605 and CPU 602. In other alternative topologies, parallel processing subsystem 612 is connected to I/O bridge 607 or directly to CPU 602, rather than to memory bridge 605. In still other embodiments, one or more of CPU 602, I/O bridge 607, parallel processing subsystem 612, and memory bridge 605 may be integrated into one or more chips. The particular components shown herein are optional; for instance, any number of add-in cards or peripheral devices might be supported. In some embodiments, switch 616 is eliminated, and network adapter 618 and add-in cards 620, 621 connect directly to I/O bridge 607.

One advantage of the disclosed power supply RC-based ESD protection clamp circuit that is that the circuit uses a resistor and capacitor having a smaller RC time constant compared with conventional ESD protection circuits. Therefore, the layout area of the capacitor is reduced. The power supply RC-based ESD protection clamp circuit also has a very high allowable power-up voltage slew rate so that power-up, hot-plug, and power supply switching applications are not recognized as ESD events.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. An RC-based electrostatic discharge (ESD) protection circuit, comprising:
a RC filter and pull-up sub-circuit that is configured to detect an ESD event and pull-up a switch node, wherein the RC filter is directly coupled to the pull-up sub-circuit and includes a resistor and a first capacitor having an RC time constant;
a controlling sub-circuit that is coupled to the RC filter and pull-up sub-circuit and activated after the switch node is pulled up by the RC filter and pull-up sub-circuit and includes a source follower that is configured to isolate the switch node from a VDD supply and a GND supply after the switch node is pulled up by the RC filter and pull-up sub-circuit; and
an ESD sub-circuit that is coupled to the switch node and is activated to conduct an ESD current when the switch node is pulled-up by the RC filter and pull-up sub-circuit.

2. The RC-based ESD protection circuit of claim 1, further comprising a pull-down sub-circuit coupled between the ESD sub-circuit and a VPD node.

3. The RC-based ESD protection circuit of claim 2, wherein the controlling sub-circuit comprises a dynamic voltage divider that controls a voltage level of the VPD node.

4. The RC-based ESD protection circuit of claim 3, wherein the dynamic voltage divider comprises the source follower and is coupled between an active resistor and a controlling transistor.

5. The RC-based ESD protection circuit of claim 2, wherein the pull-down sub-circuit is configured to couple the switch node to the GND supply when an ESD event is not detected to disable the ESD sub-circuit.

6. The RC-based ESD protection circuit of claim 2, wherein the pull-down sub-circuit is configured to couple the switch node to the GND supply during a power-up event to disable the ESD sub-circuit.

7. The RC-based ESD protection circuit of claim 2, wherein the pull-down sub-circuit is configured to couple the switch node to the GND supply during a hot-plug event to disable the ESD sub-circuit.

8. The RC-based ESD protection circuit of claim 2, wherein the pull-down sub-circuit is configured to couple the switch node to the GND supply during a power-switching operation to disable the ESD sub-circuit.

9. The RC-based ESD protection circuit of claim 1, wherein the controlling sub-circuit further comprises a second capacitor that is coupled in parallel with the first capacitor.

10. The RC-based ESD protection circuit of claim 9, further comprising a first inverter and a second inverter that are coupled between the controlling sub-circuit and the switch node and configured as a buffer.

11. The RC-based ESD protection circuit of claim 10, further comprising a third capacitor that is coupled between an input of the first inverter and the GND supply.

12. The RC-based ESD protection circuit of claim 1, wherein the RC-filter and pull-up sub-circuit is disabled after the switch node is pulled-up.

13. The RC-based ESD protection circuit of claim 1, wherein the detection of the ESD event by the RC filter and pull-up sub-circuit is based on the RC time constant and a slew rate of an input transient voltage.

14. A method for providing electrostatic discharge (ESD) protection for a circuit, the method comprising:
receiving a transient voltage at an RC-based ESD protection circuit;
determining that the transient voltage represents an ESD event and that ESD protection should be activated;
pulling up a switch node by an RC filter and pull-up sub-circuit to enable an ESD sub-circuit to conduct an ESD current, wherein the RC filter is directly coupled to the pull-up sub-circuit;
deactivating the RC filter and pull-up sub-circuit once the switch node is pulled-up; and
isolating the switch node from a VDD supply and a GND supply by a controlling sub-circuit that is activated as the switch node is pulled up, wherein the ESD sub-circuit continues to conduct the ESD current when the switch node is isolated by a source follower included in the controlling sub-circuit.

15. The method of claim 14, wherein a dynamic voltage divider included in the controlling sub-circuit and including the source follower operates to isolate the switch node from the VDD supply and the GND supply.

16. The method of claim 15, wherein an active resistor in the voltage divider dynamically adjusts a voltage level that ensures the ESD sub-circuit continues to conduct the ESD current.

17. The method of claim 15, wherein "butterfly type" circuitry included in the controlling sub-circuit delays the operation of the dynamic voltage divider so that the RC-based ESD protection circuit is not falsely triggered to perform ESD protection during a power-up application including "hot-plug" and power supply switching operations.

18. The method of claim 14, further comprising pulling the switch node down to deactivate the ESD sub-circuit when the ESD event terminates.

19. The method of claim 14, wherein determining is based on the slew rate of the transient voltage and the RC time constant of the power supply RC-based ESD protection clamp circuit.

20. The method of claim 14, wherein the RC time constant value is less than about 20 nanoseconds.

21. An integrated circuit, comprising:
   A VDD power supply that is coupled to an input pin of the integrated circuit; and
   An RC-based electrostatic discharge (ESD) protection circuit that is coupled to the VDD power supply, wherein the ESD protection circuit comprises:
      an RC filter and pull-up sub-circuit that is configured to detect an ESD event and pull-up a switch node, wherein the RC filter is directly coupled to the pull-up sub-circuit;
      a controlling sub-circuit that is coupled to the RC filter and pull-up sub-circuit and is activated after the switch node is pulled up by the RC filter and pull-up sub-circuit and includes a source follower that is configured to isolate the switch node from the VDD supply and a GND supply after the switch node is pulled up by the RC filter and pull-up sub-circuit;
      an ESD sub-circuit that is coupled to the switch node and is activated to conduct an ESD current when the switch node is pulled-up by the RC filter and pull-up sub-circuit; and
      a controlled pull-down sub-circuit that is coupled to the switch node and controlled by the controlling sub-circuit to pull the switch node down and disable the ESD sub-circuit when the ESD event terminates.

* * * * *